United States Patent

[11] 3,566,199

| [72] | Inventors | Wilhelm Kolster;<br>John F. Bolinger, Michigan City, Ind. |
|---|---|---|
| [21] | Appl. No. | 751,235 |
| [22] | Filed | Aug. 8, 1968 |
| [45] | Patented | Feb. 23, 1971 |
| [73] | Assignee | Meridian Industries, Inc.<br>Southfield, Mich. |

[54] PROTECTIVE MEANS FOR TRANSISTORIZED LOAD CIRCUIT
17 Claims, 4 Drawing Figs.

[52] U.S. Cl. .................................................. 317/33,
317/52, 315/200, 331/62
[51] Int. Cl. ................................................ H02h 7/00
[50] Field of Search .......................................... 331/62;
317/33, 52, 148.5, 123 (CM); 315/200.1

[56] References Cited
UNITED STATES PATENTS

| 3,303,387 | 2/1967 | Springer | 317/33X |
| 3,409,803 | 11/1968 | DeWitt | 317/33 |
| 3,421,108 | 1/1969 | Keller | 331/62X |
| 3,002,112 | 9/1961 | Rubin | 317/123CM |

*Primary Examiner*—James D. Trammell
*Assistant Examiner*—Harvey Fendelman
*Attorney*—Barnard, McGlynn & Reising ABSTRACT: A transistorized switching circuit for flashers such as used on automotive vehicles in which the power or load switching transistor is automatically rendered nonconductive to load currents, i.e., "turned off," in the event of a short in the load circuit. Circuit means may also be provided to reversely bias the power or load switching transistor when it is nonconducting so as to minimize dangerous leakage currents through the transistor.

INVENTORS:
WILHELM K. KOLSTER
JOHN F. BOLINGER
BY
Dale A. Winnie
ATTORNEY

PROTECTIVE MEANS FOR TRANSISTORIZED LOAD CIRCUIT

This invention relates to flashers such as commonly employed on automotive vehicles or the like, and more particularly to means for protecting transistorized switching elements from short circuits and overloads in the load circuit of such flashers.

A transistorized switching circuit for operating automotive or like flashers is shown and described in copending application Ser. No. 569,505, filed Aug. 1, 1966, now Pat. No. 342,108 and assigned to the same assignee as the present invention. This circuit comprises, in essence, a multivibrator circuit and a power load switching transistor operated by the multivibrator circuit. The present invention is, in a broad sense, an improvement over such circuit in that it provides protection for the power or load switching transistor in the event of a short circuit in the load circuit.

An object of the invention, therefore, is the provision of circuit means for protecting the power or load switching transistor of a transistorized flasher circuit from the effects of short circuits or similar disturbances in the load circuit.

Another object of the invention is the provision of a transistorized flasher in which the power load switching transistor is rendered automatically nonconductive in the event of a short circuit or the like in the load circuit.

Another object of the invention is to provide, in a transistorized flasher system, means for not only automatically rendering the power or load transistor nonconductive in the event of a short circuit or the like in the load circuit but also to maintain said transistor nonconductive until such time as the short circuit or the like is corrected.

A further object is the provision of a short circuit protective circuit which minimizes leakage currents through the power or load switching transistor during periods of nonconduction.

A still further object of the invention is to provide a load switching transistor for flasher circuits which is protected against overloads caused by either short circuits or reverse currents.

In the main aspect of the invention, a free-running astable multivibrator drives a power or load switching transistor to effect intermittent flashing of a lamp or similar load. Circuit means interposed in the base circuit of the load switching transistor effects "turn off" or nonconductive of the switching transistor upon a short in the load circuit. Such "turn off" means, for example, may comprise a load operated switch means connected in the base circuit of the load switching transistor. Alternatively, solid state circuitry means may provide for the "turn off."

It a second aspect the power or load switching transistor is reverse biased during nonconductive to minimize leakage currents through the transistor which might otherwise severely damage the transistor.

The above and other objects features and advantages of the invention will become apparent from the following description considered in conjunction with the accompanying drawings which are merely exemplary of the invention.

Figure 1:
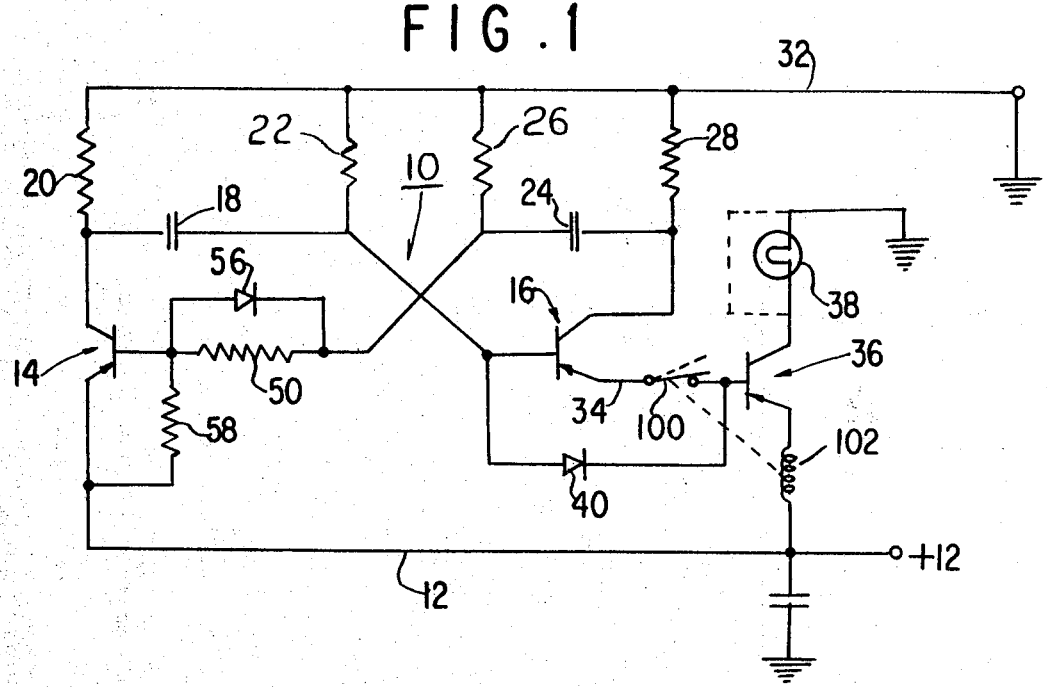
FIG. 1 is a wiring diagram illustrating one embodiment of the invention.

Referring now in greater detail to the drawings, FIG. 1 illustrates a transistorized flasher circuit as comprising a multivibrator circuit 10 and a power load switching transistor 36. The multivibrator 10 includes the transistors 14 and 16 with the output of the transistor 16 connected to the base of switching transistor 36. Resistors 50, 58 and diode 56 provide reverse voltage protection for the transistor 14 during conduction of transistor 16 in the manner described in the aforesaid application Ser. No. 569,505, and diode 40 provides protection to transistor 16 while supplying reverse bias to load switch 36 to minimize leakage of currents therethrough, as also previously described in said application. Other reference numerals in FIG. 1 correspond to like numbered parts in the copending application and are included on FIG. 1 of the drawing for reference purposes only, their operation being well understood in the electronic circuitry art. In like manner, similar elements in FIGS. 2, 3, and 4 have the same reference numbers with the letters A, B, and C appended thereto.

The aforesaid circuit of FIG. 1, however, does not provide protection for the load transistor in the event of a short in the load circuit. For this purpose, normally closed switch means 100 is interposed in the line 34 connecting the emitter of transistor 16 with the base of the load transistor 36. Means, such as a coil 102, may be placed in series circuit with the load circuit for actuating switch means 100. The ampere turn pull rating of the coil 102 is such that the switch means 100 remains closed under normal operation and current requirements of the lamp load 38. However, in the event that a short circuit occurs, as for example diagrammatically illustrated by the dash line in shunt with the load 38, the increased abnormally high current flow through the coil 102, is sufficient because of the turn-pull rating thereof, to actuate switch means 100 to open position as illustrated in dash line. Once switch means 100 is opened, transistor 36 is, of course, rendered nonconductive. Such a nonconductive state of transistor 36 would be maintained until such time that the short circuit was corrected and switch means 100 again closed.

From the above it can be seen that coil 102 and switch means 100 in effect combine to provide means sensitive to the occurence of a short circuit in the load circuit for turning off the power transistor 36.

In at least one successful embodiment of the invention it was found that switch means 100 could be comprised of a reed switch. In any event, it should be apparent that switch means 100 serves generally as a fuse which, once reset after correction of the short circuit, enables power transistor 36 to be driven into conduction.

Figure 2:
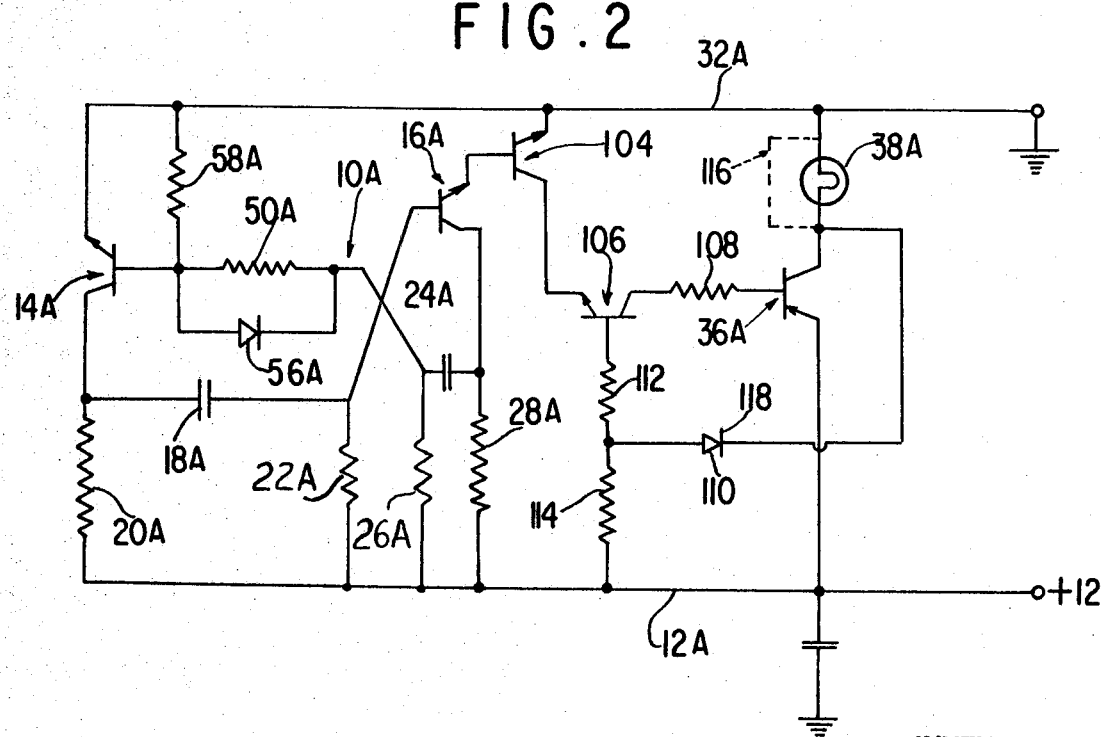
FIG. 2 is a wiring diagram illustrating a second embodiment of the invention.

FIG. 2 illustrates another embodiment of the invention in which the protection of the load transistor 36 from shorts in the load circuit is entirely transistorized. Referring to FIG. 2, the output of multivibrator transistor 16A controls and transistor 104 which in turn controls a transistor 106 connected to the base of load switching transistor 36A through a resistor 108. A diode 110 connected as to the midpoint of a voltage divider 112—114 is shunted across the load transistor 36A. The voltage divider 112—114 is connected between the base of transistor 106 and the power line 12A. The operation of this circuit is as follows. When the transistor 16A of the multivibrator 10 is turned on, it drives the transistor 104 into conduction and this in turn renders the transistors 106 and 36A conductive, the base current of transistors 36A flowing through the collector-emitter circuits of transistors 104 and 106. The polarity of diode 110 is such that it is nonconducting during normal operation of the flasher, and therefore has no effect on the circuit. That is, during normal operation of the circuit, diode 110 is reverse biased thereby preventing conduction therethrough. For example, typically in a 12.0 volt system as shown, when transistor 36A is made conductive the cathode 118 of diode 110 is at a positive potential of 11.5 volts (12.0 volts minus 0.5 volts drop across the emitter-collector of transistor 36A). However, as in certain of the successful embodiment of the invention, the voltage at the junction of resistors 112 and 114 as in the order of 6.0 volts to 8.0 volts. Therefore, at this time the anode of diode 110 is at a +8.0 volts while the cathode 118 is at a +11.5 volts. However, for a diode to be conducting the anode must be more positive than the cathode; accordingly, it can be seen that during normal operation diode 110 will be reverse biased thereby preventing conduction therethrough. If, however, a short occurs in the load circuit, as indicated by the dashed lines 116, the cathode 118 of diode 110 is connected to ground thereby causing the diode to conduct and turn off the switching transistor 36A. Upon removal of the short, the circuit is returned to normal operating condition.

Figure 3:
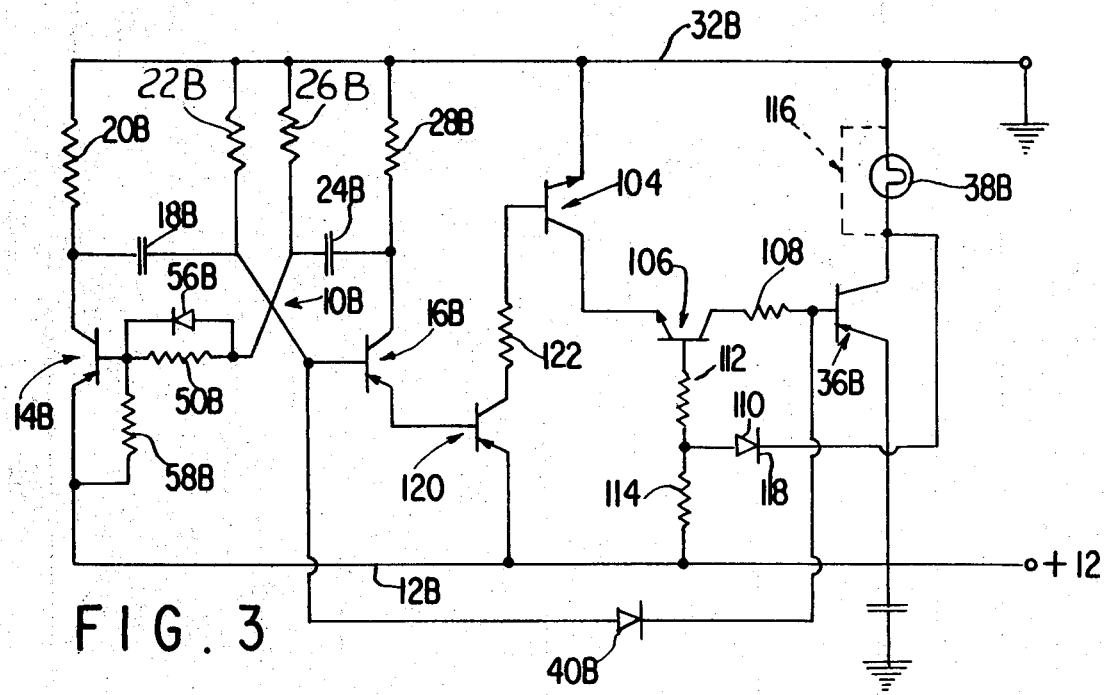
FIG. 3 is a wiring diagram illustrating another embodiment of the invention.

FIG. 3 illustrates another embodiment of the invention which is, in effect, a modification of the circuit of FIG. 1 wherein a diode 40B provides reverse bias to the load switching transistor 36B during periods of nonconduction thereby to minimize leakage currents therethrough in a manner similar to the diode of FIG. 1. In this embodiment, however, the multivibrator transistors 14B and 16B have been changed from the NPN to the PNP type and a converter 120 and resistor 122 are required, the basic circuits of FIGS. 2 and 3 being otherwise similar as indicated by like reference numerals. Diode 40B is connected to the capacitor 18B of the multivibrator 10B and to the base of load switching transistor 36B, and operates in a manner generally similar to that of diode 40 in FIG. 1.

Figure 4:
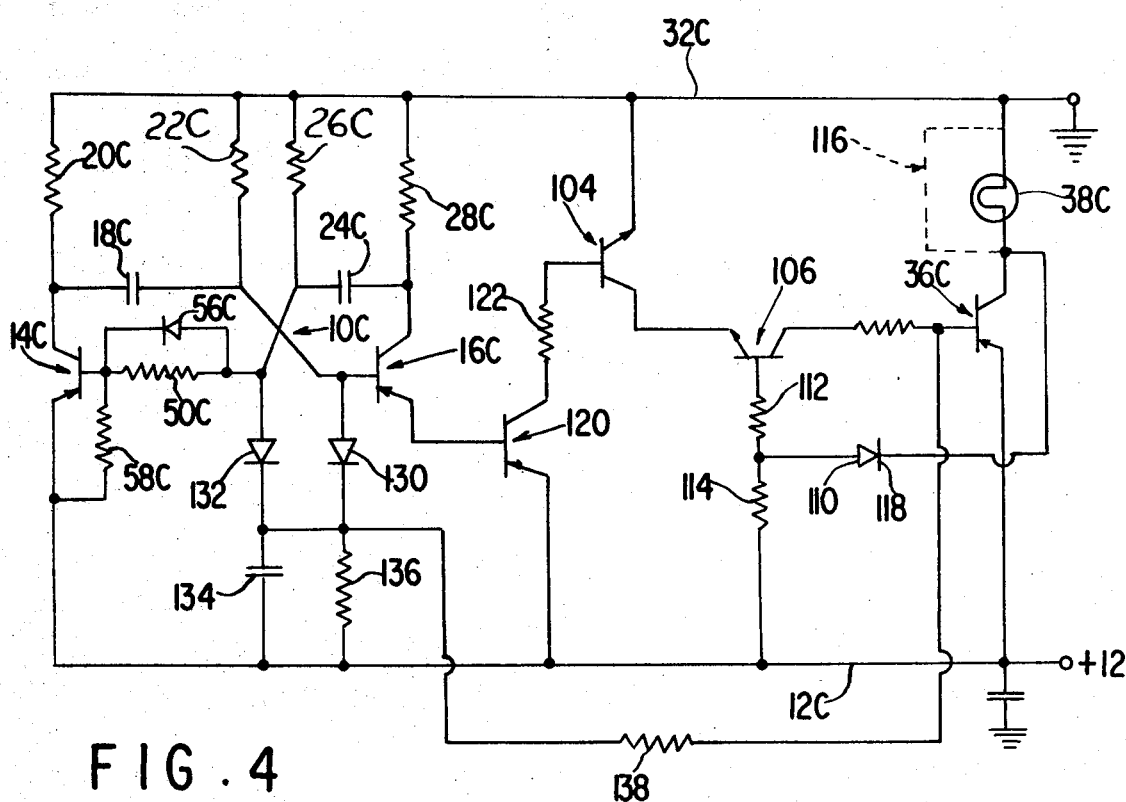
FIG. 4 is a modification of the invention as disclosed by FIG. 3.

FIG. 4 of the drawings illustrates a modification of the invention is which full protection of the load switching transistor 36C against damaging reverse currents is afforded during both normal and short circuit operation. Here again, like reference numerals designate like or similar parts. FIG. 4 differs primarily from FIG. 3 is that each of the capacitors 18C and 24C of the multivibrator 10C has a diode 130 and 132 connected to the base of load switching transistor 36C. Also connected in this circuit is a capacitor 134 and a shunt resistance 136 which serve as a filtering circuit. After removal of a short in the load circuit, capacitor 134 discharges through resistance 136, thereby to return the circuit to normal operation.

While only selected embodiments of the invention have been disclosed and described, it is apparent that other embodiments and modifications of the invention are possible within the scope of the appended claims.

We claim:

1. An electric circuit, comprising a power transistor having a base electrode, emitter electrode and a collector electrode, a load circuit including an electrical load, said emitter electrode and said collector electrode being in series circuit with said load circuit, a multivibrator electrically connected to said base electrode and effective for cyclically producing and applying a timed electrical signal thereto in order to bias said power transistor into conduction thereby completing said load circuit through said emitter and collector electrodes, and means sensitive to an occurence of an abnormally high current flow through said load circuit as occassioned by a short circuiting of said load for enabling said multivibrator to continue cyclic generation of said timed electrical signal while preventing the application of said timed electrical signal to said base electrode thereby rendering said power transistor nonconductive.

2. An electric circuit according to claim 1, wherein said means sensitive to an abnormally high current flow comprises normally closed switching means in series circuit with said multivibrator and said base electrode, said switching means being actuated to an electrically open condition upon the occurence of said abnormally high current flow.

3. An electric circuit according to claim 2, wherein said normally closed switching means comprises a mechanical switch member positionable into either of two positions one of which permits said signal generating means to apply said electrical signal to said power transistor in order to drive said transistor into conduction.

4. An electric circuit according to claim 1, wherein said means sensitive to an abnormally high current flow comprises normally electrically closed switching means in series circuit with said multivibrator and said base electrode, and electrical inductance means effective for causing said switching means to be inductively actuated to an electrically open condition upon the occurence of said abnormally high current flow.

5. An electric circuit according to claim 4, wherein said switching means comprises a reed switch.

6. An electric circuit according to claim 1, wherein said multivibrator comprises a first transistor, a second transistor, said second transistor having an emitter-collector circuit and a base electrode, said emitter-collector circuit of said second transistor being in series circuit with said base electrode of said power transistor, and wherein said means sensitive to an abnormally high current flow comprises normally closed switching means in series circuit with and between said emitter-collector circuit of said second transistor and said base electrode of said power transistor.

7. An electric circuit according to claim 6 wherein said means sensitive to an abnormally high current flow also comprises a coil serially situated in said load circuit and effective upon the occurrence of said abnormally high current flow to actuate said switching means to an electrically open condition.

8. An electrical circuit, comprising a power transistor having a base electrode, emitter electrode, a load circuit including an electrical load, said emitter electrode and said collector electrode being in series circuit with said load circuit, electrical signal generating means electrically connected to said base electrode and effective for producing and applying an electrical signal thereto in order to bias said power transistor into conduction thereby completing said load circuit through said emitter and collector electrodes, and means sensitive to an occurence of an abnormally high current flow through said load circuit as occassioned by a short circuiting of said load for eliminating said bias thereby rendering said power transistor nonconductive, a second transistor having it emitter-collector circuit serially connected between said electrical signal generating means and said base electrode of said power transistor, and said means sensitive to an abnormally high current flow comprising a diode electrically connected at one end to a base electrode of said second transistor and electrically connected at its other end to said load circuit at a point which is on the same side of said power transistor as is said load, said diode being polarized to become conductive upon occurrence of said abnormally high current flow.

9. In a transistorized switching circuit such as used in flashers for automotive vehicles, the combination including a transistor free-running multivibrator circuit means, a load circuit, a load switching transistor connecting in said load circuit, means connecting an output of said multivibrator circuit means with a control electrode of said load switching transistor in order to cyclically produce and apply a timed electrical signal in said load switching transistor thereby to effect intermittent operation of said switching transistor, and protective means connected to said control element for enabling said multivibrator to continue cyclic production of said timed electrical signal while preventing the application of said timed electrical signal to said control electrode thereby rendering said switching transistor nonconductive upon the occurrence of short in said load circuit.

10. A combination as defined in claim 9 in which said protective means includes a normally closed switch member serially connected in the circuit to said control element of the load switching transistor, and a coil for operating said switch member connected in said load circuit, the pull of said coil being insufficient to open said switch member except under short circuit condition.

11. In a transistorized switching circuit such as used in flashers for automotive vehicles, the combination including a two transistor multivibrator circuit means, a load circuit, a load switching transistor connected in said load circuit, means connecting said multivibrator circuit means with a control electrode of said load switching transistor thereby to effect an intermittent operation of the switching transistor, protective means connected to said control element for rendering said switching transistor nonconductive upon the occurence of a short in said load circuit, said protective means including a transistor connected in the circuit to said control element of the load switching transistor, and a diode connected to a control element of said last named transistor and to said load circuit on the far side of said switching transistor, said diode being polarized to become conductive upon occurence of a short in the load circuit.

12. A combination as defined in claim 11 in which said diode is connected to the intermediate point of a voltage divider connected to the control element of said last named transistor.

13. A combination as defined in claim 11 wherein said multivibrator circuit means includes at least one capacitor means, and a second diode is connected to said capacitor means and to said control element of said load switching transistor, said second diode being polarized to be conductive during nonconductive periods of the load switching transistor.

14. A combination as defined in claim 11 wherein said multivibrator circuit means includes a pair of capacitor means, and each of said capacitor means is connected to said control element of said load switching transistor through a diode means, said last named diode means being polarized to be conductive during nonconductive periods of the load switching transistor.

15. A combination as defined in claim 14 in which a capacitance-resistance network is connected to said last named diode means thereby to filter the diode circuit while providing for return of the load circuit to normal operating condition by discharge of said capacitance through said resistance.

16. In a transistorized switching circuit, such as used for automotive vehicles, the combination including first means for producing an intermittent electrical signal, a load circuit including an electrical load, a load switching transistor connected in said load circuit, circuit means for connecting said first means with a control electrode of said load switching transistor in order to apply thereto said intermittent electrical signal and thereby to effect intermittent operation of said switching transistor, protective means connected to said control element for rendering said switching transistor nonconductive upon the occurence of an abnormally high current flow in said load circuit as occassioned by a short circuit in said load circuit, said protective means comprising a second transistor connected in said circuit means to said control element of the load switching transistor, and a diode connected to a control element of said second transistor and to said load circuit on the same side of said switching transistor as is the said load, said diode being polarized to become conductive upon occurrence of short circuit conditions in said load circuit.

17. A transistorized switching circuit according to claim 16 wherein said diode is connected to an intermediate point of a voltage divider connected to the control element of said second transistor.

UNITED STATES PATENT OFFICE
CERTIFICATE OF CORRECTION

Patent No. 3,566,199                    Dated   February 23, 1971

Inventor(s)      Wilhem K. Kolster et al.

It is certified that error appears in the above-identified patent and that said Letters Patent are hereby corrected as shown below:

Column 4, line 17, after "electrode", second occurrence, insert -- and a collector electrode --; line 29, "it" should read -- its --; line 40, after "a" insert -- two --; line 42 "connecting" should read -- connected --; line 46, "in" shou read -- to --.

Signed and sealed this 9th day of November 1971.

(SEAL)
Attest:

EDWARD M. FLETCHER, JR.           ROBERT GOTTSCHALK
Attesting Officer                 Acting Commissioner of Pate

FORM PO-1050 (10-69)